United States Patent
Barda

(10) Patent No.: US 7,087,193 B2
(45) Date of Patent: Aug. 8, 2006

(54) STABILIZER COMPOSITION FOR USE IN POLYVINYL CHLORIDE FORMULATIONS HAVING A MIXTURE OF AT LEAST ONE ORGANOTIN SULFIDE, AT LEAST ONE ORANOTIN CHLORIDE, AND AT LEAST ONE FREE MERCAPTAN

(75) Inventor: Henry J. Barda, North Brunswick, NJ (US)

(73) Assignee: Akzo Nobel N.V. (NL)

( * ) Notice: Subject to any disclaimer, the term of this patent is extended or adjusted under 35 U.S.C. 154(b) by 376 days.

(21) Appl. No.: 10/432,111

(22) PCT Filed: Nov. 27, 2001

(86) PCT No.: PCT/US01/44325

§ 371 (c)(1),
(2), (4) Date: May 19, 2003

(87) PCT Pub. No.: WO02/42369

PCT Pub. Date: May 30, 2002

(65) Prior Publication Data

US 2004/0034139 A1    Feb. 19, 2004

Related U.S. Application Data

(60) Provisional application No. 60/250,395, filed on Nov. 27, 2000.

(51) Int. Cl.
  *C09K 15/10* (2006.01)
  *C07F 7/22* (2006.01)
  *C08K 5/57* (2006.01)
  *C08K 5/58* (2006.01)

(52) U.S. Cl. .............. 252/406; 252/400.1; 252/182.29; 524/180; 524/181

(58) Field of Classification Search ................ 252/399
See application file for complete search history.

(56) References Cited

U.S. PATENT DOCUMENTS

| | | | |
|---|---|---|---|
| 4,120,845 A | 10/1978 | Kugele | 260/45.75 S |
| 4,217,258 A | 8/1980 | Minagawa | 260/23 XA |
| 4,255,320 A | 3/1981 | Brecker et al. | 260/45.75 |
| 4,345,045 A | 8/1982 | Jennings et al. | 524/180 |
| 4,615,836 A | 10/1986 | Bobsein | 260/399 |
| 4,701,486 A | 10/1987 | Bresser et al. | 524/182 |
| 5,078,892 A | 1/1992 | Beekman et al. | 252/39 |
| 5,109,046 A * | 4/1992 | Larkin et al. | 524/178 |
| 5,567,751 A | 10/1996 | Hoch | 524/181 |
| 6,232,380 B1 | 5/2001 | Conroy et al. | 524/181 |

FOREIGN PATENT DOCUMENTS

| | | |
|---|---|---|
| EP | 890608 | 1/1999 |
| EP | 945484 | 9/1999 |
| EP | 1004624 | 5/2000 |
| EP | 396345 | 11/2000 |
| WO | 90/03999 | 4/1990 |
| WO | 97/25373 | 7/1997 |
| WO | 99/09094 | 2/1999 |

* cited by examiner

Primary Examiner—Joseph D. Anthony
(74) Attorney, Agent, or Firm—Louis A. Morris

(57) ABSTRACT

A stabilizer composition, for use in polyvinyl chloride formulations, that is a mixture of: at least one organotin sulfide; at least one organotin chloride; and at least one free mercaptan.

11 Claims, No Drawings

STABILIZER COMPOSITION FOR USE IN POLYVINYL CHLORIDE FORMULATIONS HAVING A MIXTURE OF AT LEAST ONE ORGANOTIN SULFIDE, AT LEAST ONE ORANOTIN CHLORIDE, AND AT LEAST ONE FREE MERCAPTAN

CROSS REFERENCE TO RELATED APPLICATIONS

This patent claims priority from U.S. patent application Ser. No. 60/250,395, filed Nov. 27, 2000.

Among alkyltin compounds, mercaptides are the most versatile heat stabilizers (examples of uses of such mercaptides, which contain tin-mercaptide bonds therein, can be found in U.S. Pat. No. 4,255,320 and PCT International Patent Publication No. 97/25373). Sulfides are not very effective on their own, but are used synergistically with mercaptides. Chlorides are weak stabilizers (see R. D. Dworkin, Chapter 19 in J. Edenbaum, Handbook of Polymer Additives). However, they are used together with other stabilizers to improve early color (e.g., Tables XIV and XV in European Patent Publication No. 890,608). Free (unreacted) mercaptans are known to improve color hold when added to other tin stabilizers (see, for example, U.S. Pat. No. 4,701,486 and PCT Patent Publication No. WO 99/09094). Mercaptans, and some organic derivatives, together with metal-based heat stabilizers and/or Lewis acids, which include organotin chlorides, are reported to be heat stabilizers or improved heat stabilizers (European Patent Publication Nos. 890,608 and 945,484).

In accordance with the present invention, it has been found that the compositions of the present invention (for example, as shown in Example 1), which, unlike conventional organotin heat stabilizers, does not contain any organotin mercaptides, is as effective as one that does.

The stabilizer composition of the present invention comprises the following three essential components: at least one organotin sulfide; at least one organotin chloride; and at least one free mercaptan.

The type of organotin sulfide that can be used herein is exemplified by either (or both) of the monoalkyltin sulfide and dialkyltin sulfide compounds that have the formulae $(RSnS_{1.5})_4$ and $(R_2SnS)_3$, respectively, with R being an alkyl group of from one to about twelve carbon atoms, with the butyl group being especially preferred. This organotin sulfide component is present at from about 20% to about 45%, by weight of the three previously enumerated essential stabilizer components.

The type of organotin chloride that can be used herein is exemplified by either (or both) of the monoalkyltin trichloride and dialkyltin dichloride compounds that have the formulae $RSnCl_3$ and $R_2SnCl_2$, respectively, with R, again, being an alkyl group of from one to about twelve carbon atoms, with the butyl group being especially preferred. This organotin chloride component is present at from about 3% to about 20%, by weight of the three previously enumerated essential stabilizer components.

The free mercaptan component of the stabilizer mixture is present in larger amount that the two previously described components (for example, at from about 30% to about 70%, by weight of the all three essential stabilizer components). The three general types that can be employed are from the following known classes: the "reverse ester" type; the mercaptoesters; and the alkyl mercaptans.

The reverse ester-type is a reaction product, for example, of 2-mercaptoethanol (a preferred mercaptoalkanol reagent) and a carboxylic acid, such as tall oil fatty acids (producing, for example, 2-mercaptoethyl tallate), adipic acid (producing, for example, 2-mercaptoethyl adipate), and the like. The formula of these compounds is illustrated by HSRL, where R is an alkylene group of up to about four carbon atoms in length (ethylene being preferred) and L is a ligand such as —OC(O)R', where R' is, for example, alkenyl of from about six to about twenty carbon atoms in length (as exemplified by tallate) or alkyl of from eight to twelve carbon atoms.

Another class of compound useful herein are the conventional mercaptoesters, as exemplified by the reaction product of thioglycolic acid (also known as mercaptoacetic acid, $HSCH_2CO_2H$, and an alcohol, which is commonly 2-ethylhexanol or isooctanol. Representative, preferred species within this class are 2-ethylhexyl thioglycollate and isooctyl thioglycollate.

Yet another class of mercaptan for use herein are the alkyl mercaptans (RSH, with R being an alkyl group from 8 to 14 carbon atoms in length, dodecyl being exemplary and a preferred choice).

The previously described three component stabilizer mixture, which is adapted to be used in conventional polyvinyl chloride formulations, can be dissolved in a larger amount of solvent containing conventional additives, such as antioxidants, lubricants, and antistats.

The present invention, in regard to certain preferred embodiments thereof, is further illustrated by the Examples that follow.

EXAMPLE 1

A solution was made with the following composition:

|  | Weight % |
|---|---|
| 2-Mercaptoethyl tallate | 38.5 |
| Nonylphenol | 5.7 |
| Telura 323* | 34.0 |
| Butyltin sulfide | 7.9 |
| Dibutyl sulfide | 5.7 |
| Butyltin chloride | 4.9 |
| Dibutyl chloride | 3.3 |
|  | 100.0 |

*Telura 323 is a naphthenic hydrocarbon, industrial process oil, available from Exxon.

The composition of Example 1 had a tin content of 10 wt %.

The control was Interstab T-4997, an organotin mercaptide/sulfide in diluents, also containing 10% tin, which is commercially available from Akzo Nobel.

The previously described formulations were then tested in a polyvinyl chloride formulation as described below:

| Formulation | Weight % |
|---|---|
| Poly(vinyl chloride), 225, Oxychem | 100.0 |
| Impact modifier, Paraloid KM334, Rohm & Haas | 5.0 |
| Processing aid, Paraloid K120N, Rohm & Haas | 0.5 |
| Calcium stearate, Norac | 1.1 |
| External lubricant, Rheolube 315S, Allied Chemical | 1.1 |
| Calcium carbonate, Omyacarb UFT, Omya | 12.0 |
| Titanium dioxide, R-960, DuPont | 2.0 |
| Heat stabilizer (either Interstab T-4997 or the product from Example 1) | 1.1 |

Dynamic Stability Evaluation

A 184.4 g charge of the formulation was processed on a Farrel two roll mill set at 380° F., a roll speed of 33/28 rpm, and a 0.02" gap. Samples were taken at two minute intervals starting at three minutes. The Hunter b values were then determined on a Color Quest II instrument, Hunter Lab with lower b values being an indication of better performance. The results were as follows:

| | Hunter b values | | | |
|---|---|---|---|---|
| | Minutes: | | | |
| | 3 | 5 | 7 | 9 |
| T-4997 | 4.6 | 4.9 | 5.1 | 5.8 |
| Product of Example 1 | 3.9 | 4.6 | 5.1 | 5.6 |

Except for the first sample, which was better for the product of Example 1, the color development for the two stabilizers was equivalent.

The foregoing Examples, since they are intended to only illustrate certain preferred embodiments of the present invention, should not be construed in a limiting sense. The scope of protection sought is set forth in the claims that follow.

The invention claimed is:

1. A stabilizer composition, for use in polyvinyl chloride formulations consisting essentially of a mixture of: from about 20% to about 45%, by weight of at least one organotin sulfide; from about 3% to about 20%, by weight of at least one organotin chloride; and from about 30% to about 70%, by weight of at least one free mercaptan.

2. The composition as claimed in claim 1 wherein the organotin sulfide is selected from the group consisting of monoalkyltin sulfide, dialkyltin sulfide, and mixtures thereof.

3. The composition as claimed in claim 1 wherein the organotin chloride is selected from the group consisting of monoalkyltin trichloride, dialkyltin dichloride, and mixtures thereof.

4. The composition as claimed in claim 1 wherein the free mercaptan is of the formula HSRL, where R is an alkylene group of up to about four carbon atoms in length and L is—OC(O)R', where R' is selected from the group consisting of alkenyl of from about six to about twenty carbon atoms in length and alkyl of from eight to twelve carbon atoms.

5. The composition as claimed in claim 1 wherein the organotin sulfide is selected from the group consisting of monobutyltin sulfide, dibutyltin sulfide, and mixtures thereof.

6. The composition as claimed in claim 1 wherein the organotin chloride is selected from the group consisting of monobutyltin trichloride, dibutyltin dichloride, and mixtures thereof.

7. The composition as claimed in claim 1 wherein the free mercaptan is of the formula HSRL, where R is ethylene and L is—OC(O)R', where R' is alkenyl of from twelve to about twenty carbon atoms.

8. The composition as claimed in claim 1 wherein the free mercaptan is 2-mercaptoethyl tallate.

9. A stabilizer composition, for use in polyvinyl chloride formulations, which consists essentially of a mixture of: from about 20% to about 45%, by weight of at least one butyltin sulfide; from about 3% to about 20%, by weight of at least one butyltin chloride; and from about 30% to about 70%, by weight of at least one free mercaptan of the formula HSRL, where R is an alkylene group of up to about four carbon atoms in length and L is—OC(O)R', where R' is selected from the group consisting of alkenyl of from about six to about twenty carbon atoms in length and alkyl of from eight to twelve carbon atoms.

10. A stabilizer composition, for use in polyvinyl chloride formulations consisting essentially of a mixture of: from about 20% to about 45%, by weight of at least one butyltin sulfide; from about 3% to about 20%, by weight of at least one butyltin chloride; and from about 30% to about 70%, by weight of at least one free mercaptan of the formula HSRL, where R is ethylene and L is—OC(O)R', where R' is selected from the group consisting of alkenyl of from twelve to about twenty carbon atoms in length.

11. The composition as claimed in claim 10 wherein the free mercaptan is 2-mercaptoethyl tallate.

* * * * *